June 28, 1966  C. F. BATCHELDER ETAL  3,257,677
RELEASABLE ATTACHING DEVICE
Filed Aug. 19, 1964

INVENTORS:
CHARLES F. BATCHELDER
JEROME A. RUBICO
BY,
Russell, Chittick, & Pfund
ATTORNEYS United States Patent Office 3,257,677
Patented June 28, 1966

3,257,677
RELEASABLE ATTACHING DEVICE
Charles F. Batchelder, Milton, and Jerome A. Rubico, Boston, Mass., assignors to Batchelder-Rubico, Inc., Boston, Mass., a corporation of Massachusetts
Filed Aug. 19, 1964, Ser. No. 390,520
6 Claims. (Cl. 12—142)

This invention relates generally to releasable attaching devices and, more particularly, to arrangements performing an attachment between two members with the use of an adhesive tape where the actual attachment between the members is formed by a web of tape rather than a direct adhesive bond between the members. This application is related to the subject matter of the co-pending application of the same inventors filed August 19, 1964, Serial Number 390,526.

A temporary bond between members which must be releasably secured has been provided in the past by the use of ordinary adhesives and, more recently, by the use of double-faced pressure-sensitive tape between the members which served the purpose of providing a direct adhesive bond over a substantial area that joined the two members. In attachments with adhesives or double-faced tape the holding power is generally directly related to the area of the bond and the force necessary to release the bond is similarly related to the nature of the adhesive bond and the strength provided taking into account the various factors of the type of the adhesive and the nature of the surfaces to which it is applied. In general, bonds of this type can be released only by overcoming the tension strength of the bond if the releasing force is applied normal to the plane of the bonded surfaces or by overcoming the shear strength of the bond if a force is applied in the direction of the bonded surfaces tending to cause relative motion therebetween.

Under certain situations the disadvantages of having to overcome the shear strength of the bond by separating forces that are operative generally in the plane of the bonded surfaces are sufficient to prevent the use of a particular adhesive bond of the type just described. A particular instance where this difficulty is present is in the temporary attachment of an insole to a shoe last to hold the insole in place while the shoe is lasted after which the last must be removed from the finished shoe with a sliding motion which is generally in the direction of the sole surface on the last. Direct bonding of these surfaces by temporary means has in the past led to such expedients as employing an air blast between the last and the insole of the finished shoe to rupture the bond therebetween since overcoming the shear strength of the bond has been found to be commercially impractical. It is, accordingly, the primary object of the present invention to provide a releasable bonding device particularly useful in bonding together members which are to be separated and where the separation forces which can be applied are limited as to direction and magnitude particularly in approximately the plane of the bonded surfaces. As the invention finds particular utility in the temporary bonding of an insole to a shoe last in the manufacture of shoes as above described, the description of the invention will proceed with respect to the attaching device used for this particular purpose.

Other objects and advantages of the invention will be apparent from the following detailed description taken in conjunction with the accompanying drawing wherein FIG. 1 is a perspective view of one form of the attaching device in accordance with the invention;

Figure 1:
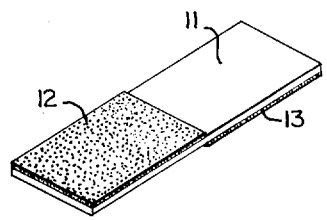

Referring now to FIG. 1, one form of the invention comprises a flexible web 11 which may be made of cloth, plastic or paper or any suitable base material such as is generally employed for pressure-sensitive tape construction as the base material to which the adhesive layer is applied. In accordance with the present invention the base 11 has applied to opposite sides thereof alternate non-overlapping areas 12 and 13 of the pressure-sensitive adhesive layer which is to be used. The actual substance for the base strip 11 and the pressure-sensitive adhesive areas 12 and 13 will vary with the application and can be selected from any of the generally well-known materials used in the manufacture of pressure-sensitive tape. In the actual manufacture of the device of FIG. 1 the coating of the tape 11 with the staggered areas 12 and 13 on opposite sides thereof can be carried on while the web from which tape 11 is supplied runs through a coating station where the top and bottom surfaces thereof are alternately spray coated or otherwise suitably coated as indicated in FIG. 1.

Figure 2:
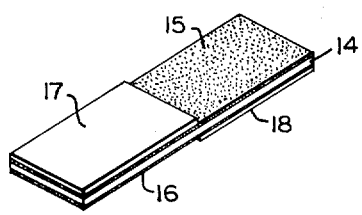
FIG. 2 is a perspective view of a modified form of the invention.

An alternative construction is shown in FIG. 2 wherein a conventional strip of double-faced pressure-sensitive tape 14 is employed. The tape 14 has an upper surface 15 and a lower surface 16 coated with pressure-sensitive adhesive in a conventional manner and to this adhesive is secured a non-adhesive patch 17 and 18 on the upper and lower sides of the tape 14 respectively. The patches 17 and 18 are non-overlapping and thus provide each surface of the tape 14 with alternate adhesive coated areas 15 and non-adhesive exposed area 17 on the top surface and similarly an adhesive exposed surface 16 and a non-adhesive exposed surface 18 on the bottom surface thereof. The patches 17 and 18 may be any suitable material such as paper or the like which has a non-adhesive exterior surface.

In using the invention one of the releasable attaching devices of FIG. 1 or FIG. 2 is placed between the two surfaces to be attached and pressure is applied to secure the exposed adhesive areas of the device to the respective surfaces. Since the devices of FIG. 1 and FIG. 2 can be made extremely thin the two surfaces to be joined are actually capable of being placed in very intimate contact but there is in reality no adhesive bond therebetween since each adhesive exposed surface is operative against only one of the surfaces to be secured together and the actual connection therebetween is the web portion of the tape 11 or 14 between the two oppositely disposed adhesive patches. Since the adhesive areas 12 and 13 or 15 and 16 are substantially contiguous and non-overlapping the web connection between these adhesive patches is substantially a line of negligible width and as such it provides considerable strength in holding the two joined surfaces particularly with respect to forces applied tending to move the surfaces in the direction of the line. In this respect the line joining the opposite faced adhesive patches of the present invention serves the function of the fold which is present in the attaching device disclosed and claimed in applicants' above referenced copending application.

Figure 3:
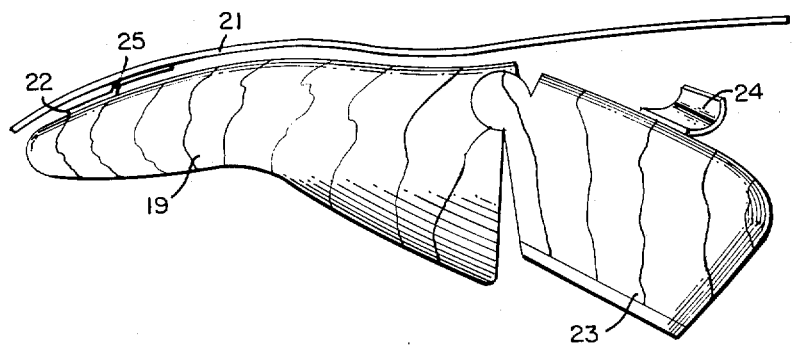
FIG. 3 is a side elevational view of a shoe last and insole which have been attached by one of the devices of the invention and which are in the process of being separated by a sliding force in the direction of the sole surface of the last.

Referring now to FIG. 3 the operation of the releasable attaching device of the invention with respect to removing an insole from a shoe last will be described. It will be understood that generally the last will be removed from the insole after the shoe is finished and that as a consequence the only motion available with respect to the toe portion of the last is a sliding motion similar to the withdrawal of the human foot from the shoe. As shown in FIG. 3 a last 19 has an insole 21 secured thereto by one or more of the attaching devices of FIG. 1 and FIG. 2 represented as device 22. In a representation of the device 22 the actual construction in accordance with either of FIGS. 1 or 2 is not illustrated in FIG. 3. It will be understood that during the lasting process the insole 21 is in intimate contact with the sole portion of the last 19 and the device 22 is perfectly flat. When the finished shoe is to be delasted the heel portion 23 is broken away and any attachment 24 of the type provided by the present invention or otherwise attaching the heel portion of the last 23 to the heel portion of the insole 21 is broken by direct tension pull. It remains for the last 19 to be slid out of the finished shoe and for a motion of this type the attaching device 22 transmits what is ordinarily a shear force on the adhesive bond through web portion 25 to the adhesive bond thereby providing a peeling action even though the forces applied to cause relative motion to the last 19 and insole 21 is confined to the plane of these surfaces. Thus it can be seen that the device 22 will be peeled off with the web portion 25 becoming larger and larger as either one or the other of the bonded areas gives way to the peeling action of the sliding forces applied between the last 19 and the insole 21. Thus it has been found that the last can readily be removed from the insole without any additional assistance from air blast mechanism or undue separating forces which might tend to harm the finished shoe.

While the present invention has been described in its presently preferred embodiment, modifications will be obvious in view of the principles disclosed and, accordingly, the invention is to be limited only by the scope of the appended claims.

We claim:

1. The method of temporarily holding two surfaces in intimate contact and subsequently separating said surfaces by relative motion initially confined to sliding along said surfaces comprising the steps of bonding a linear tape segment to said surfaces with substantially contiguous, non-overlapping, pressure-sensitive adhesive areas on opposite faces of said segment, pressing said surfaces into intimate contact with said tape segment flattened and unfolded therebetween, and ultimately separating said surfaces by initial relative sliding motion in a direction such that said areas slide past each other and the connecting tape between said adhesive areas applies a f which tends to peel said areas from the surfaces to w they are attached.

2. The method of claim 1 in which said linear segment comprises a base strip having pressure-sens coated areas on opposite faces thereof, said areas b substantially contiguous and non-overlapping.

3. The method of claim 2 in which said linear t segment comprises a length of double-faced press sensitive tape having contiguous non-overlapping r adhesive patches bonded to opposite faces thereof.

4. The method of making a shoe comprising the st of attaching an insole to a last with a linear segm of pressure-sensitive adhesive tape having substanti contiguous non-overlapping adhesive areas on oppo faces of said segment, applying forces to bring said sole into intimate contact with said last with said t segment flattened and unfolded therebetween, and u mately separating said last from said insole by an ini sliding motion that applies peeling forces to the : hesive areas by the tape connection therebetween.

5. The method of claim 4 in which said tape segm( is disposed on the sole portion of said last and align substantially along the longitudinal dimension of s last.

6. The method of claim 5 and including a similar ta segment disposed between the heel portion of said l and insole and aligned transverse to said longitudir direction.

References Cited by the Examiner

UNITED STATES PATENTS

| 2,096,351 | 10/1937 | Semonsen | 24—67 |
| 2,387,593 | 10/1945 | Lesser | 24—67 |
| 2,755,576 | 7/1956 | Golden | 24—67 |
| 3,052,904 | 9/1962 | Reid et al. | 12—14 |
| 3,168,749 | 2/1965 | Cala | 2—24 |

FOREIGN PATENTS 872,398   6/1942   France.

FRANK J. COHEN, *Primary Examiner.*

JORDAN FRANKLIN, *Examiner.*

P. D. LAWSON, *Assistant Examiner.*